(12) United States Patent
Won et al.

(10) Patent No.: US 7,662,904 B2
(45) Date of Patent: Feb. 16, 2010

(54) AROMATIC POLYETHER RESINS CROSSLINKED BY AMIC ACID OR IMIDE SIDE CHAIN

(75) Inventors: Jong Chan Won, Daejeon (KR); Yong Seok Kim, Daejeon (KR); Eun Sang Lee, Daejeon (KR); Jae Heung Lee, Daejeon (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 129 days.

(21) Appl. No.: 11/352,885

(22) Filed: Feb. 13, 2006

(65) Prior Publication Data

US 2006/0217518 A1 Sep. 28, 2006

(30) Foreign Application Priority Data

Mar. 25, 2005 (KR) ...................... 10-2005-0024824

(51) Int. Cl.
*C08G 75/00* (2006.01)
*C08G 8/02* (2006.01)
*C08G 14/00* (2006.01)

(52) U.S. Cl. .................. 528/171; 528/125; 528/172; 528/173; 528/174

(58) Field of Classification Search .............. 528/125, 528/171–174
See application file for complete search history.

(56) References Cited

U.S. PATENT DOCUMENTS 3,663,507 A * 5/1972 Vogel et al. .................. 528/173
3,970,603 A * 7/1976 Gray ............................ 525/55
4,064,110 A * 12/1977 Arlt et al. .................... 525/437
4,110,274 A * 8/1978 Corbett et al. .............. 521/157
RE31,103 E * 12/1982 Gotcher et al. ............. 428/35.7
4,377,536 A * 3/1983 Waitkus et al. .............. 562/853
4,661,604 A * 4/1987 Lubowitz et al. ............ 548/435
4,874,803 A * 10/1989 Baron et al. .................. 524/94
4,889,636 A * 12/1989 Perry et al. .................. 210/651
4,959,437 A * 9/1990 Kunimune et al. ........... 528/26
5,028,337 A * 7/1991 Linder et al. ................ 210/642

(Continued)

FOREIGN PATENT DOCUMENTS

JP 2002-060506 2/2002
JP 2003-191370 7/2003
KR 1020010076642 A 8/2001

OTHER PUBLICATIONS

Horiki et al., Synthesis of the Merrifield REsin Esters of N-Protected Amino Acids with the Aid of Hyrogen Bonding, Chemistry Letters, 1978, (2), 165-168.*

(Continued)

*Primary Examiner*—Mark Eashoo
*Assistant Examiner*—Liam J Heincer
(74) *Attorney, Agent, or Firm*—Frommer Lawrence & Haug LLP; Ronald R. Santucci

(57) ABSTRACT

The present invention relates to aromatic polyether resins crosslinked with amic acid or imide side chain, and more particularly, to the aromatic polyether resin crosslinked by amic acid or imide side chain, which is produced by heat curing of amic acid, wherein introduction of imide groups to the basic backbone provides excellent chemical resistance as well as heat resistance and improves surface roughness when coated as a thin film so that it can be suitable for films and flexible display plate substrate.

6 Claims, 3 Drawing Sheets

U.S. PATENT DOCUMENTS

| | | | | |
|---|---|---|---|---|
| 5,288,834 | A * | 2/1994 | Roovers et al. | 528/125 |
| 5,376,689 | A * | 12/1994 | Tseng et al. | 521/27 |
| 5,493,002 | A * | 2/1996 | McGrath et al. | 528/310 |
| 5,631,333 | A * | 5/1997 | Weber et al. | 525/535 |
| 5,759,711 | A * | 6/1998 | Miyabayashi et al. | 429/15 |
| 5,761,809 | A * | 6/1998 | Fuller et al. | 29/890.1 |
| 5,824,240 | A * | 10/1998 | Sato et al. | 252/582 |
| 5,844,065 | A * | 12/1998 | Liaw et al. | 528/353 |
| 5,849,824 | A * | 12/1998 | Mercer et al. | 524/297 |
| 6,090,453 | A * | 7/2000 | Narang et al. | 427/504 |
| 6,200,715 | B1 * | 3/2001 | Fuller et al. | 430/59.6 |
| 6,451,956 | B2 * | 9/2002 | Sorriero et al. | 528/170 |
| 6,639,042 | B1 * | 10/2003 | Baek et al. | 528/170 |
| 6,740,371 | B1 * | 5/2004 | Hosaka et al. | 428/1.2 |
| 7,067,608 | B2 * | 6/2006 | Bender | 528/125 |
| 2003/0024816 | A1 * | 2/2003 | Aritomi et al. | 204/523 |
| 2003/0100682 | A1 * | 5/2003 | Ohrbom et al. | 525/242 |
| 2005/0049390 | A1 * | 3/2005 | Brunelle et al. | 528/425 |

OTHER PUBLICATIONS

J. Y Kim, et al., Polymer-Based Multi-Layer Conductive Electrode Film for Plastic LCD Applications, Appl. Phys. A 72, 699-704 (2001).

Avram Ecaterina, et al., Polymers with pendent functional groups. V. Thermooxidative and thermal behavior of chloromethylated polysulfones, Polymer Degradation and Stability 69 (2000) pp. 175-181.

* cited by examiner

AROMATIC POLYETHER RESINS CROSSLINKED BY AMIC ACID OR IMIDE SIDE CHAIN

CROSS REFERENCE TO RELATED APPLICATION

This application is based on, and claims priority from Korean Patent Application No. 10-2005-0024824, filed on Mar. 25, 2005, the disclosure of which is hereby incorporated by reference.

FIELD OF THE INVENTION

The present invention relates to aromatic polyether resins crosslinked by amic acid or imide side chain. More particularly, the present invention relates to the aromatic polyether resin crosslinked by amic acid or imide side chain, which is produced by heat curing of amic acid, wherein introduction of imide groups to the basic backbone provides excellent chemical resistance and heat resistance and improves surface roughness when it is coated as a thin film so that it can be suitable for films and display substrates.

BACKGROUND OF THE INVENTION

Displays are created by arranging thin film transistor (TFT) in a matrix which acts as a controller to each pixel. The most commonly available substrate material is glass in the display fabrication process. However, glass is not desirable due to its heaviness, fragility and a relatively high cost. In addition, with the increasing demand for achieving lighter and thinner displays, more efforts have been made for the development to reduce thickness of glass substrates. However, since displays must be handled with extreme care to avoid breakage, the fabrication process becomes complicated and the manufacturing costs is increasing due to low productivity (*Appl. Phys., A*, 72, 699(2001)).

Recently, plastic has been developed to replace glass as a starting material for display fabrication. Plastic substrates are advantageous in that they are light-weighted and rugged but have also high impact resistance, flexibility, and ability for roll to roll manufacturing process so that plastics may be more widely used in place of glass on the display industry. With requirements of color clarity, high dimensional stability, low moisture absorption and the like for plastic substrates used for displays, polyethylene terephthalate (PET), polyethersulfone (PES), polycarbonate (PC), and cyclic olefin polymer have been used. With the aforementioned excellent characteristics in use for plastic substrates on displays, however, chemical resistance is also required because they are exposed to solvents for various chemical treatments during the manufacturing process. Most commercially available plastic materials are PC, PET, PES and the like but there is still significant room for improvement on chemical resistance of resins.

In order to improve the chemical resistance of resins, methods such as modification of polymer structure, surface coating and introduction of cross-likable groups have been used. A typical method for forming cured film or coating layer is to directly coat on plastic substrate with heat curable resin solution or UV curable resin solution or form a thin film having a thickness of 1-15 μm as a buffer layer. Japan Unexamined Patent Publication No. 2003-191370 discloses a method for coating thermo-setting polymer on a plastic substrate and a method for forming crosslinkage by polymerization of monomers containing acryloyl or methacryloyl groups. Japan Unexamined Patent Publication No. 2002-60506 discloses a method for coating alicyclic acrylate polymer on the surface of the plastic substrate and curing with UV rights. Further, Korea Unexamined Patent Publication No. 2001-76642 discloses that acrylate functional groups are UV-treated by dispersion of silica particles and silicone-based surfactant to enhance chemical resistance and rigidity.

However, conventional methods for coating resins on the substrate use compounds which have a different composition for coating materials from those of the substrate so that it causes separation between layers due to difference in coefficient of thermal expansion during the manufacturing process of display modules, thus resulting in distortion and haze.

Accordingly, the inventors of the present invention have noticed that even if conventional polyether resins such as polysulfone, polyethersulfone, and polycarbonate resins have excellent optical transmission, there is still limitation to use those resins for display substrates due to their poor chemical resistance and thus have intensively studied to develop polyether resins with excellent chemical resistance.

SUMMARY OF THE INVENTION

In an aspect, the present invention provides aromatic polyether resins having improved chemical resistance by crosslinking amic acid or imide side chain to the aromatic polyether resin.

In another aspect, the present invention provides a film or a sheet for displays coated with the aromatic polyether resin.

In a further aspect, the present invention provides a method for preparing the aromatic polyether resin.

BRIEF DESCRIPTION OF THE DRAWINGS

The aforementioned aspect and other features of the present invention will be explained in the following detailed description, taken in conjunction with the accompanying drawings, wherein.

DETAILED DESCRIPTION OF THE INVENTION

Figure 1:
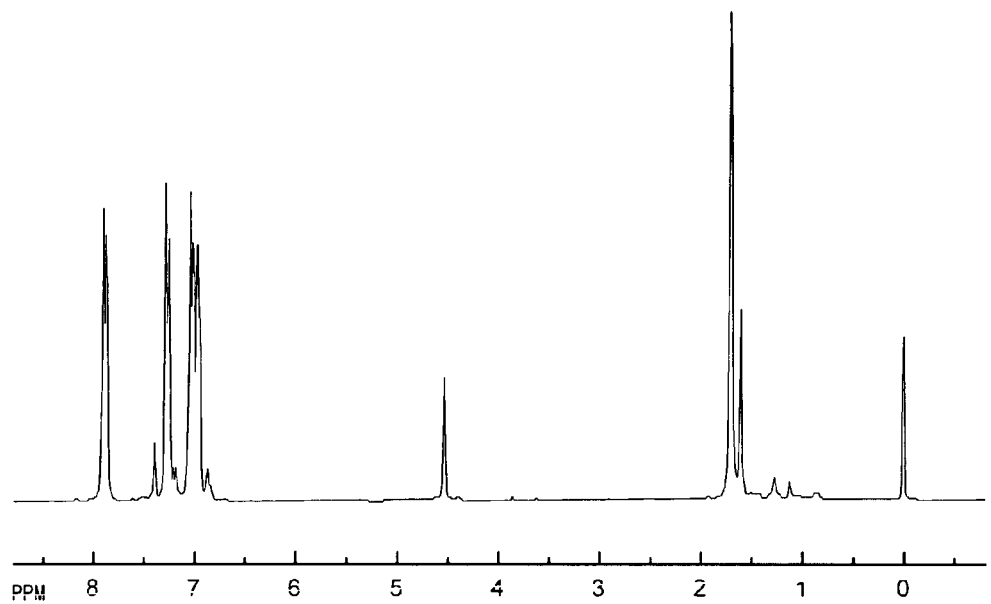
FIG. 1 is a $^1$H-NMR spectrum of chloromethylated polysulfone (CMPSF3)

In an embodiment, the present invention provides polyether resins having improved chemical resistance expressed by formula 1a or 1b, which is crosslinked by amic acid or imide,

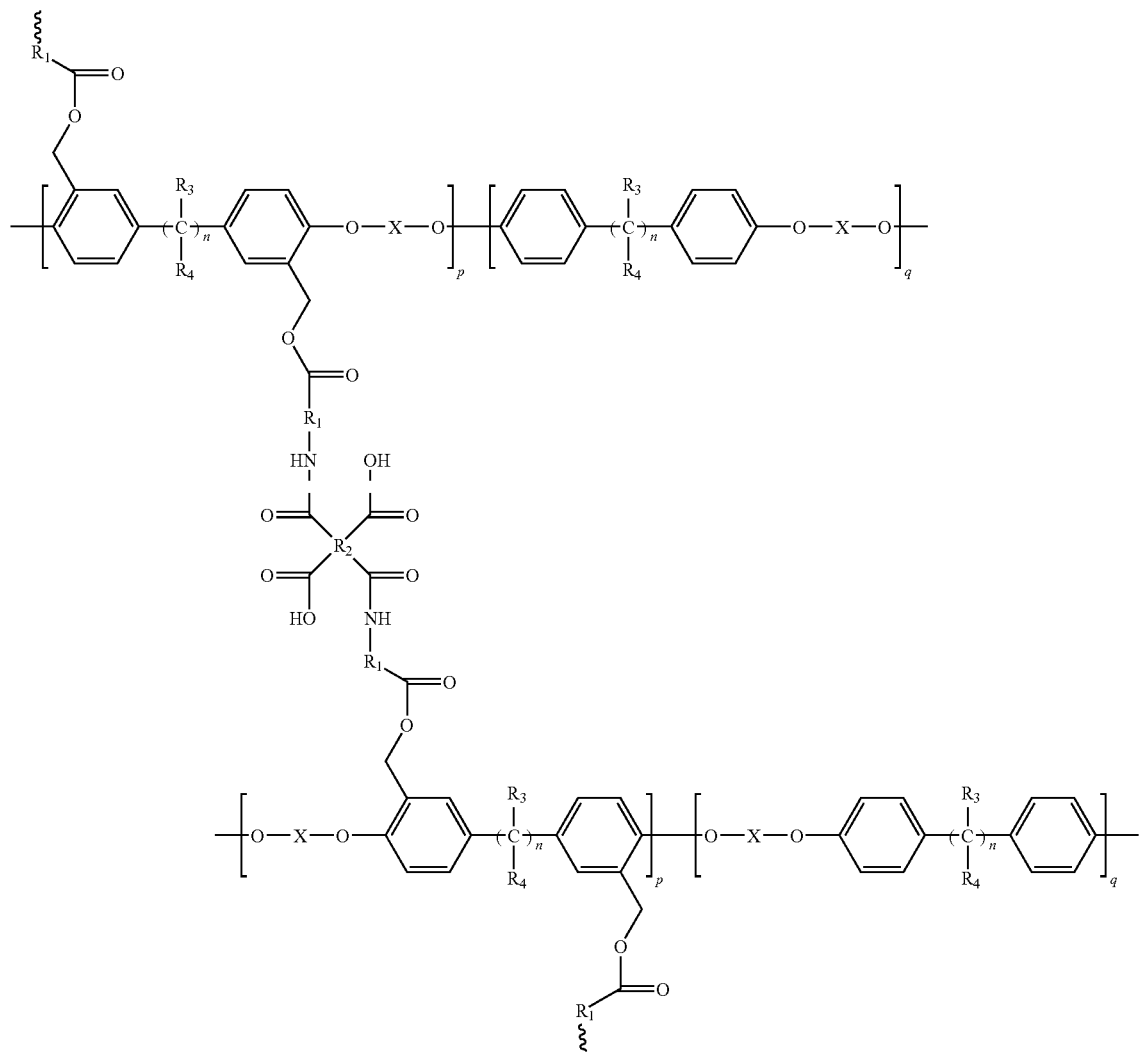
(1a)
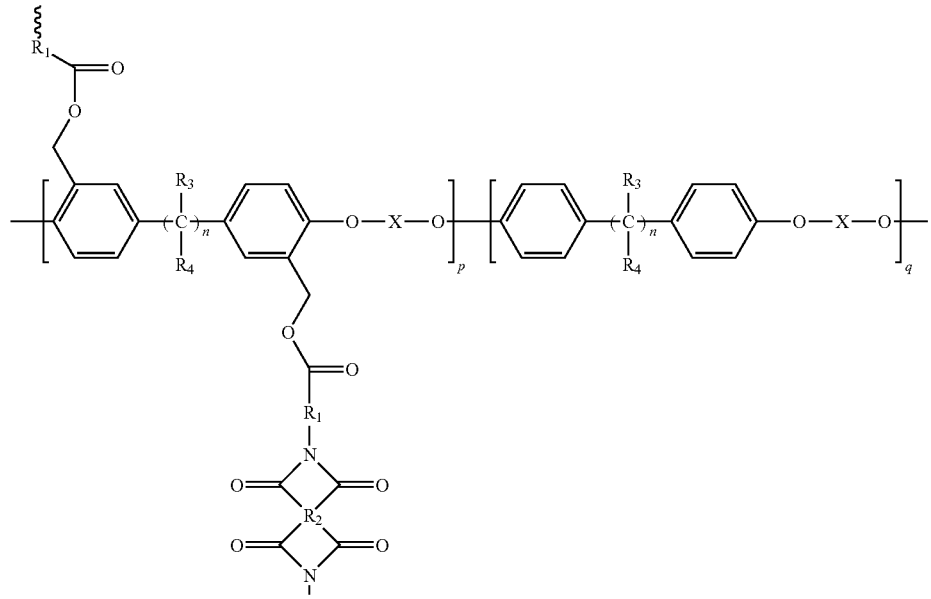
(1b)

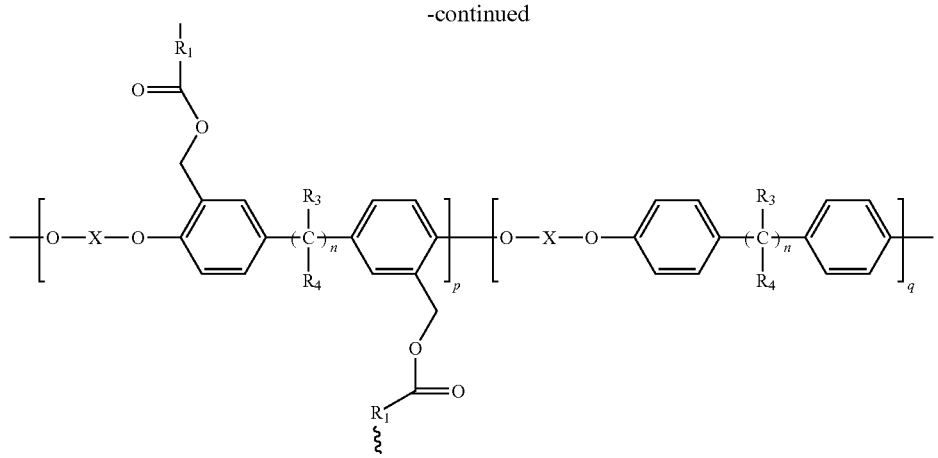

wherein X is

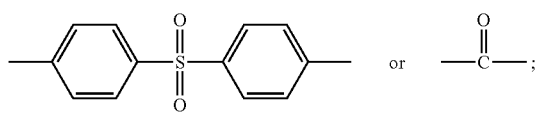

$R_1$ is an aliphatic, alicyclic, or aromatic group; $R_2$ is an aliphatic, alicyclic, or aromatic group; $R_3$ and $R_4$ are independently a hydrogen atom, a $C_1$-$C_6$ alkyl group, a phenyl group, or a benzyl group; n is an integer of 0 to 6; and p and q are independently an integer of 1 to 1000.

The present invention is described in greater detail hereinbelow.

The crosslinked aromatic polyether resin expressed by formula 1a or formula 1b has crosslinkage between backbones by amic acid or imide prepared by heat-curing of the amic acid, which is a side chain of the polyether resin to form an internal network structure, resulting in more improved chemical and heat resistance to be widely used for various films and sheets for the display.

The present invention also relates to the introduction of an amic acid or an imide group as a crosslinker to crosslink polymer backbones to improve chemical resistance. It is preferred that a repeating unit(p) including amic acid or imide group of the crosslinked aromatic polyether resin of formula 1a or formula 1b is used in the range of from 0.01 to 0.5 number of moles based on number of moles of a repeating unit(p+q). If p/p+q is less than 0.01, there is no improvement in chemical resistance and if it is higher than 0.5, it deteriorates flexibility and mechanical strength.

A method for preparing such crosslinked aromatic polyether resins according to the present invention is shown in the following Reaction Scheme 1,

[Reaction Scheme 1]

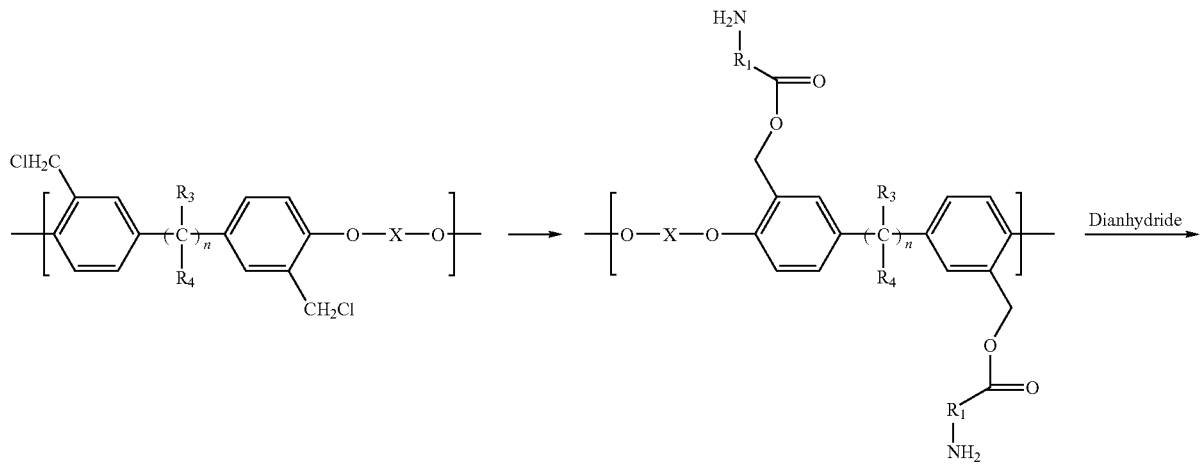

-continued
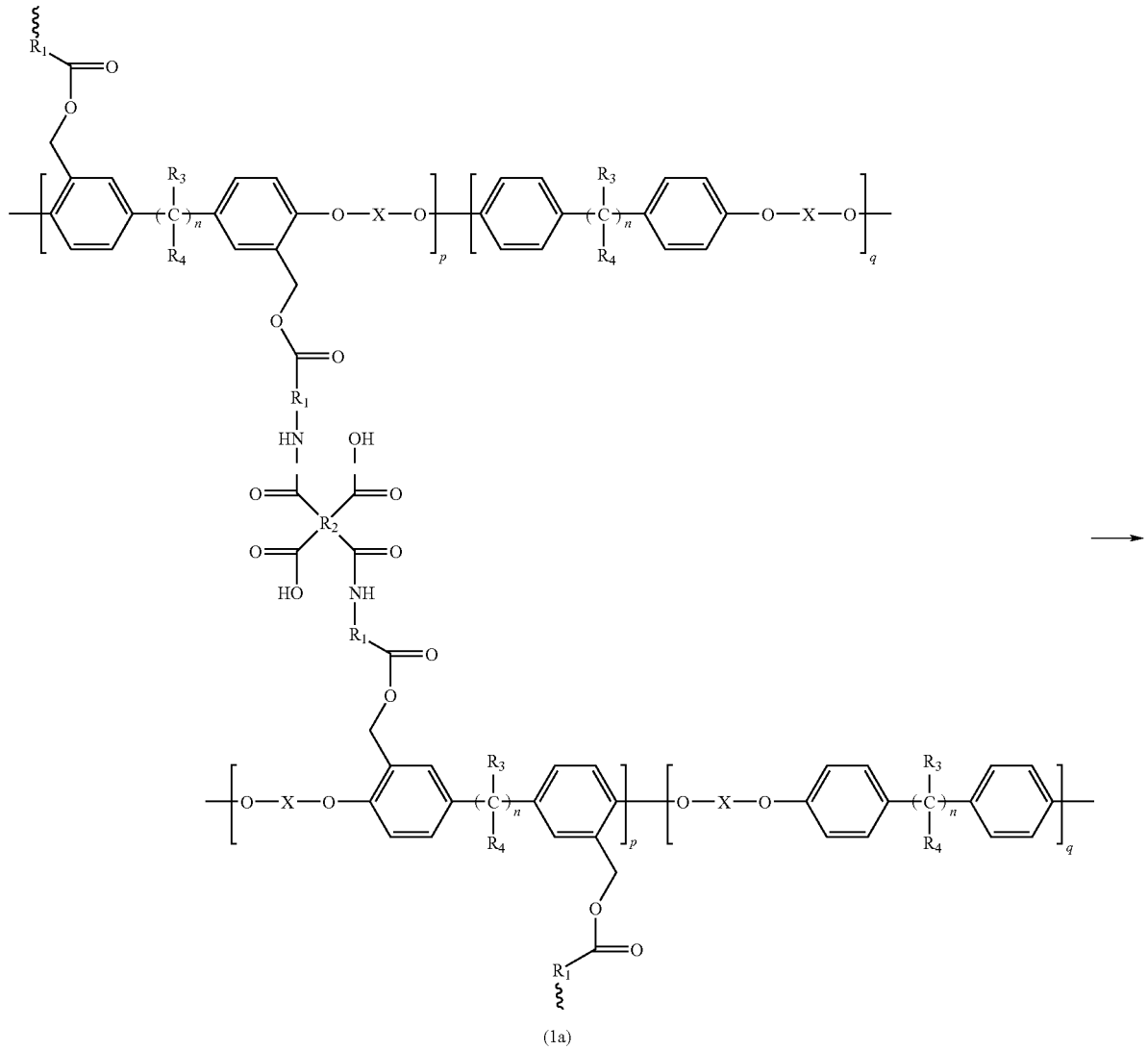
(1a)
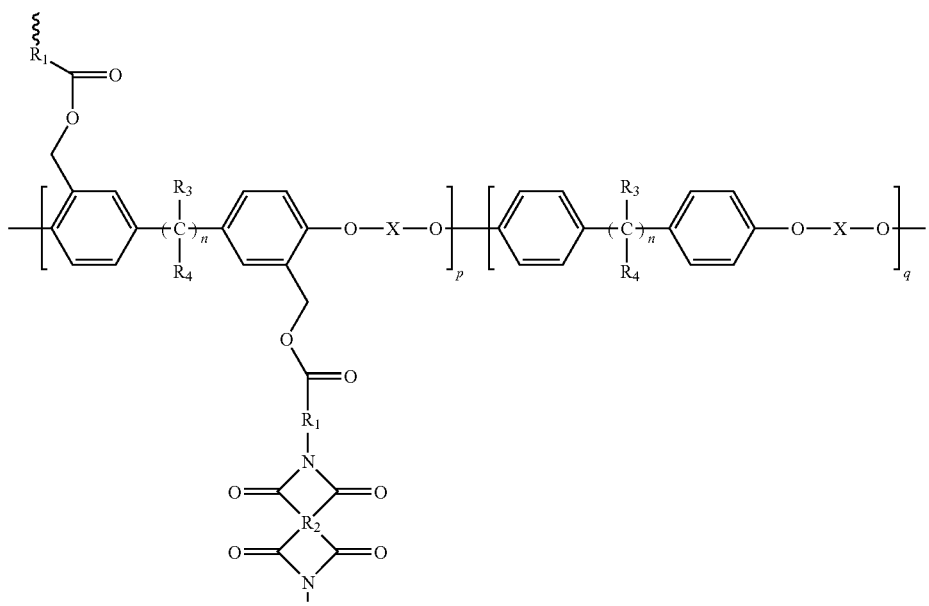

-continued

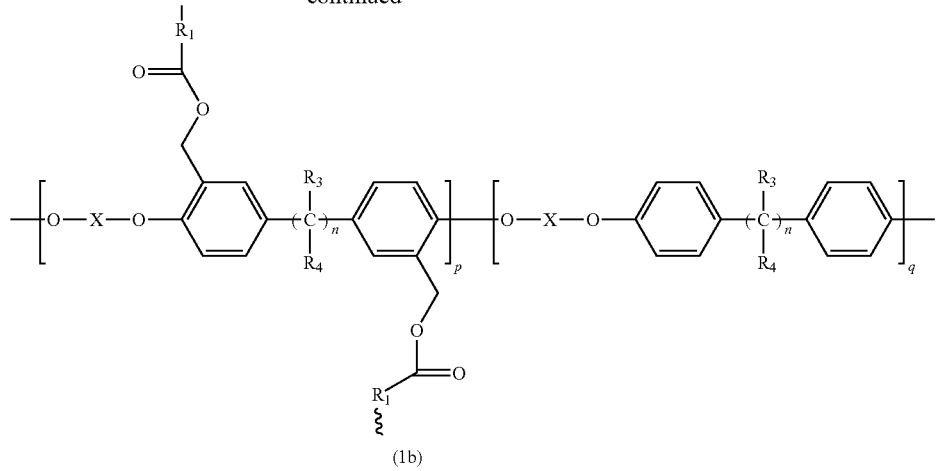

(1b)

wherein X, $R_1$, $R_2$, $R_3$, $R_4$, n, p and q are same as defined above.

The method according to Scheme 1 is described in detail.

i) Chloromethylated resin expressed by formula 2 is prepared by introducing chloromethyl group (—$CH_2Cl$) to an aromatic ring of an aromatic polyether resin.

Examples of the aromatic polyether resin include polysulfone, polyethersulfone, polycarbonate and any plastic of commercial grade having aromatic ether linkage backbone. Any method for polymerizing monomers known to one skilled in the art may be used. Any method for introducing chloromethyl group to the aromatic ring known to one skilled in the art may be also used [E. Avram, M. A. Brebu, A. Warshawsky, and C. Vasile, *Polymer Degradation and Stability*, 69, 175 (2000)]. That is, the backbone resin structure of formula 2 and its manufacturing method is not particularly limited in the present invention. n the preparation of chloromethylated polysulfone, polysulfone is dissolved in chloroform and the solution is precipitated from methanol. The purified polysulfone is dissolved in chloroform and paraformaldehyde, chlorotrimethylsilane, and Tin(IV) chloride are added thereto, followed by sufficient stirring to produce the chloromethylated polysulfone.

ii) A resin containing amine side chain (—$R_1$—$NH_2$) expressed by formula 3 is prepared by introducing an amine compound expressed by [Y—$R_1$—$NH_2$(Y≡COOH)] to the chloromethyl group of the resin of formula 2

More particularly, the resin having chloromethyl group of formula 2 is dissolved in a polar solvent such as dimethyl formaldehyde and then an amine compound, tetrabutylammonium bromide, and potassium carbonate are added thereto. The mixture solution is reacted for sufficient time while stirring. Methanol is added to precipitate out the amine group introduced product which is washed and dried. The amine compound may be aliphatic, alicyclic or aromatic amines expressed by Y—$R_1$—$NH_2$, wherein Y is —COOH. Example of the aliphatic amine includes 3-aminopropionic acid, 4-aminobutyric acid, 5-aminopentanoic acid, 6-aminohexanoic acid, and the like, example of the alicyclic amine includes 3-aminocyclobutane carboxylic acid, 3-aminocyclopentane carboxylic acid, 4-aminocyclohexane carboxylic acid, 4-aminocycloheptane carboxylic acid, and the like, and example of the aromatic amine includes 4-aminobenzoic acid, 4-amino-4-biphenyl carboxylic acid, and the like. Further, any amine described above can be used in the present invention.

iii) The resin of formula 3 having amine functional group is reacted with dianhydride to produce the resin having amic acid side chain which is crosslinked by the amic acid.

The resin of formula 3 having amine functional group is dissolved in a polar solvent such as dimethyl acetamide (DMAc), dimethyl formamide (DMF) and N-methyl pyrrolidone (NMP) to be a concentration of 1 to 40 wt % and dianhydride compound with an appropriate amount based to the amount of the amine group is added thereto and reacted for 24 hrs to produce polysulfone introduced with amic acid group. Here, the dianhydride may be any aliphatic, alicyclic or aromatic dianhydride typically used in the preparation of polyamic acid or polyimide resins. Particularly, example includes pyromellitic dianhydride (PMDA), 3,3',4,4'-benzophenone tetracarboxylic dianhydride (BTDA), 3,3',4,4'-biphenyltetracarboxylic dianhydride (BPDA), 3,3',4,4'-oxydiphthalic dianhydride (ODPA) and 3,3',4,4'-hexafluoro isopropylidene diphthalic dianhydride (6FDA), 1,2,3,4,-cyclopetane tetracarboxylic dianhydride (CPDA), 1,2,3,4,-cyclobutane tetracarboxylic dianhydride (CBDA), 5-(2,5-dioxotetrahydrofuryl-3-methyl-3-cyclohexene-1,2-dicarboxylic dianhydride (DOCDA).

iv) The resin containing amic acid side chain of formula 1a is heat-cured to provide the corresponding resin containing imide side chain of formula 1b which is crosslinked by the imide side chain.

The resin containing amic acid side chain of formula 1a is dissolved in a solvent to be a concentration of 5 to 40 wt % and the solution is formed to a film having a thickness of 10-200 μm and cured at a temperature of 60-300° C. to form imides. Here, if the concentration is less than 5 wt %, it is not allowed to form a film having a wanted thickness due to low viscosity. On the other hand, if it is higher than 40 wt %, it causes uneven-thickness during forming a film due to high viscosity. In addition, when the film is formed with thicker than 200 μm, it deteriorates processability because it takes too long to remove solvent therefrom.

The aromatic polyether resin crosslinked with amic acid or imide side chain prepared by the method of the present invention can be formed to film or sheet via solvent casting or a process of coating of a substrate, curing and drying. When solvent casting is applied, an organic polar solvent including N-methyl-2-pyrrolidone (NMP), N,N-dimethylacetamide (DMAc), dimethyl formamide (DMF), and m-cresol is used. Any additional agent such as anti-blocking agent, anti-oxidant, dye, pigment, filler, processing aid and the like may be added if needed.

Now, the present invention will be described in further detail by way of the following examples, but they should not be construed as limiting the scope of the present invention.

PREPARATION EXAMPLE 1

Preparation of Chloromethylated Polysulfone (CMPSF)

While charging 2 L of a reactor equipped with stirring plate, nitrogen injection device, temperature controller, and reflux condenser with nitrogen, polysulfone (PSF, 'Ultrason S' of BASF,

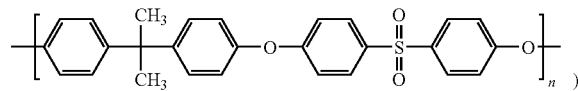

(20 g), paraformaldehyde (PFA) (13.56 g), chlorotrimethylsilane (CTMS) (49.2 g), and Tin(IV) chloride (TC) (2.356 g) were added to chloroform (CF) (660 mL). The reaction was performed for 5 to 72 hrs to control a substitution rate and chloromethyl polysulfone having a substitution rate of 1% to 50% was formed. The chloromethyl polysulfone was precipitated out from methanol and washed 3 times with methanol to produce desired chloromethyl polysulfone with a yield of 95%.

The preparation and substitution rate of the chloromethyl polysulfone was determined by hydrogen integration ratio of the chloromethyl group (4.53 ppm) and that of the methyl group of the polysulfone (1.69 ppm) in $^1$H-NMR. $^1$H-NMR spectrum for the Preparation Example 1 was shown in FIG. 1, which proved successful formation of the chloromethyl polysulfone (CMPSF3) by the method according to Preparation Example 1.

TABLE 1

| Chloromethyl polysulfone | Theoretical substitution rate | Experimental substitution rate |
|---|---|---|
| CMPSF1 | 3% | 3.2% |
| CMPSF2 | 7% | 7.5% |
| CMPSF3 | 10% | 9.8% |
| CMPSF4 | 20% | 21.3% |
| CMPSF5 | 50% | 48.2% |

PREPARATION EXAMPLE 2

Preparation of Polysulfone (PSFMAm 1) Introduced with Methylene Aminobenzylate

While charging 500 mL of a reactor equipped with stirring plate, nitrogen injection device, temperature controller, and reflux condenser with nitrogen, the chloromethyl polysulfone 20 g prepared in the Preparation Example 1 was dissolved in dimethylformamide 400 mL in the reactor. 4-Amino benzoic acid (Ab) 0.394 g, tetrabutylammonium bromide (TBAB) 0.926 g, and potassium carbonate (KC) 0.397 g were added and stirred for 24 hrs to produce polysulfone containing methylene aminobenzylate in a yield of 97%.

Figure 2:
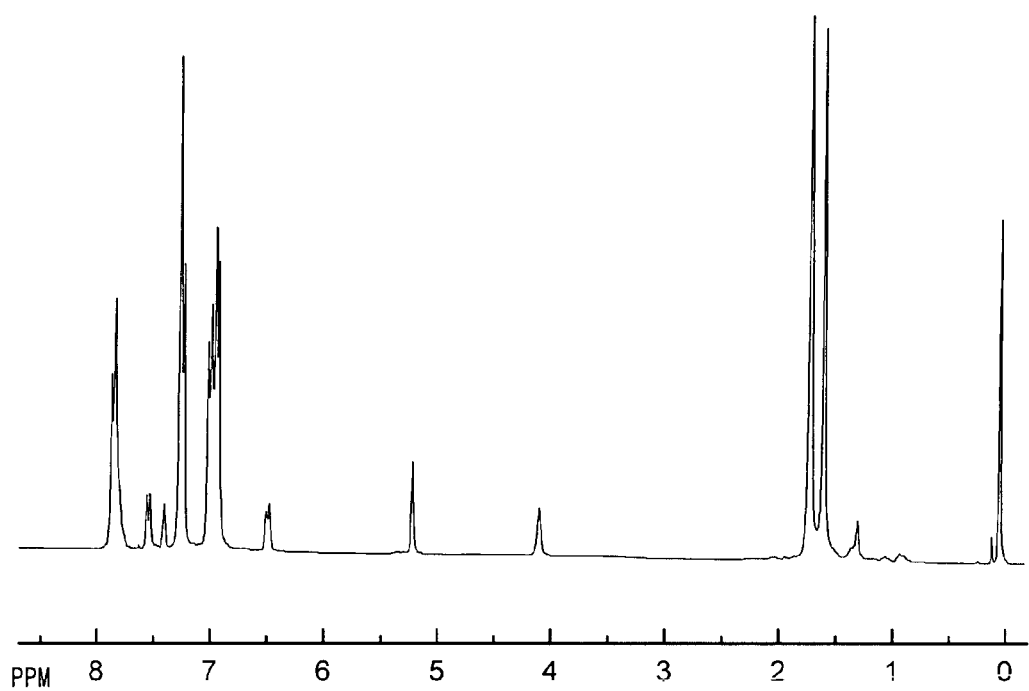
FIG. 2 is a $^1$H-NMR spectrum of polysulfone having methylene aminobenzylate side chain (PSFMAm4)

The preparation of the polysulfone containing methylene aminobenzylate group (PSFMAm4) was determined by hydrogen integration ratio of the chloromethyl group (5.21 ppm) and that of the benzoic acid group of the polysulfone (6.49 ppm, 7.54 ppm) in $^1$H-NMR. (FIG. 2)

PREPARATION EXAMPLES 3-6

Preparation of Polysulfone (PSFMAm 2-5) Containing Methylene Aminobenzylate Group While charging 500 mL of a reactor equipped with stirring plate, nitrogen injection device, temperature controller, and reflux condenser with nitrogen, the chloromethyl polysulfone prepared in Preparation Example 1 was added to the reactor. 4-Amino benzoic acid (Ab), tetrabutylammonium bromide (TBAB), and potassium carbonate (KC) were added with an appropriate amount calculated based on that of the chloromethyl polysulfone having a different substitution rate prepared in Preparation Example 1 as shown in Table 2 and the reaction mixture was reacted for 24 hrs to produce polysulfone containing methylene aminobenzylate group in a yield of 92-98%.

TABLE 2

| | Components | | | | |
|---|---|---|---|---|---|
| Category | PSF (g) | Ab (g) | TBAB (g) | KC (g) | DMF (mL) |
| Preparation Example 3 (PSFMAm2) | CMPSF2 20 | 0.915 | 2.150 | 0.922 | 400 |
| Preparation Example 4 (PSFMAm3) | CMPSF3 20 | 1.189 | 2.795 | 1.198 | 400 |
| Preparation Example 5 (PSFMAm4) | CMPSF4 20 | 2.521 | 5.925 | 2.540 | 400 |
| Preparation Example 6 (PSFMAm5) | CMPSF5 20 | 5.394 | 12.679 | 5.436 | 400 |

PREPARATION EXAMPLES 7-15

Reaction Between Polysulfone (PSFMAm 1-5) Containing Metylene Aminobenzylate and Dianhydride While charging 500 mL of a reactor e14quipped with stirring plate and nitrogen injection device with nitrogen, the polysulfone containing methylene aminobenzylate prepared in Preparation Examples 2-6 and dianhydride were added with an appropriate amount calculated based on that of the polysulfone containing methylene aminobenzylate and different substitution rate as shown in Table 3 to a reactor. The reaction mixture was reacted for 12 hrs while stirring and phthalic acid anhydride was added to treat unreacted diamine at the ends. The reaction mixture was stirred for 30 min to produce polysulfone containing amic acid.

TABLE 3

| | Components | | |
|---|---|---|---|
| Category | PSF (g) | dianhydride (g) | DMAc (mL) |
| Preparation Example 7 | PSFMAm1 20 | PMDA 0.310 | 120 |
| Preparation Example 8 | PSFMAm2 20 | PMDA 0.705 | 120 |

TABLE 3-continued

| Category | PSF (g) | | dianhydride (g) | | DMAc (mL) |
|---|---|---|---|---|---|
| Preparation Example 9 | PSFMAm3 | 20 | PMDA | 0.908 | 120 |
| Preparation Example 10 | PSFMAm1 | 20 | CBDA | 0.278 | 120 |
| Preparation Example 11 | PSFMAm3 | 20 | CBDA | 0.816 | 120 |
| Preparation Example 12 | PSFMAm5 | 20 | CBDA | 3.228 | 120 |
| Preparation Example 13 | PSFMAm2 | 20 | 6FDA | 1.435 | 120 |
| Preparation Example 14 | PSFMAm3 | 20 | 6FDA | 1.848 | 120 |
| Preparation Example 15 | PSFMAm5 | 20 | 6FDA | 7.311 | 120 |

PREPARATION EXAMPLE 16

Preparation of Chloromethylated Polycarbonate (CMPC)

While charging nitrogen into a 2 L of a reactor equipped with stirring plate, nitrogen injection device, temperature controller, and reflux condenser, polycarbonate (PC, 'Lexan' of General Electric Co., Ltd.,

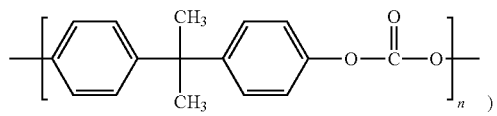

(20 g), paraformaldehyde (PFA) (23.59 g), chlorotrimethyl silane (CTMS) (85.45 g), and Tin(IV) chloride (TC) (4.09 g) were added to chloroform (CF) (884 mL). The reaction was performed for 5 to 72 hrs to control a substitution rate and chloromethylated polycarbonate having a substitution rate of 1% to 50% was formed. The chloromethyl polycarbonate was precipitated out from methanol and washed 3 times with methanol to produce desired chloromethyl polycarbonate.

The preparation and substitution rate of the chloromethyl polycarbonate were determined by $^1$H-NMR and the substitution rate of methylchloride is summarized in the following Table 4.

TABLE 4

| Category | Theoretical substitution rate | Experimental substitution rate |
|---|---|---|
| CMPC1 | 3% | 3.1% |
| CMPC2 | 7% | 6.7% |
| CMPC3 | 10% | 9.9% |
| CMPC4 | 30% | 27.3% |
| CMPC5 | 50% | 49.1% |

PREPARATION EXAMPLES 17-21

Preparation of Polycarbonate (PCMAm 1-5) Containing Methylene Aminobenzylate

While charging 500 mL of a reactor equipped with stirring plate and nitrogen injection device with nitrogen, the polycarbonate containing chloromethyl group (20 g) prepared in Preparation Examples 16 was added. 4-Amino benzoic acid (Ab), tetrabutylammonium bromide (TBAB), and potassium carbonate (KC) were added with an appropriate amount calculated based on that of the polycarbonate containing chloromethyl group as shown in Table 5 to a reactor. The reaction mixture was reacted for 24 hrs while stirring to produce polycarbonate containing methylene aminobenzylate group.

The synthesis of the polycarbonate containing methylene aminobenzylate group was determined by elementary analysis and the result is summarized in Table 6.

TABLE 5

| | | Components | | | |
|---|---|---|---|---|---|
| Category | PC (g) | Ab (g) | TBAB (g) | KC (g) | DMF (mL) |
| Preparation Example 17 (PCMAm1) | CMPC1 20 | 0.661 | 1.554 | 0.666 | 400 |
| Preparation Example 18 (PCMAm2) | CMPC2 20 | 1.409 | 3.312 | 1.420 | 400 |
| Preparation Example 19 (PCMAm3) | CMPC3 20 | 2.057 | 4.835 | 2.073 | 400 |
| Preparation Example 20 (PCMAm4) | CMPC4 20 | 5.324 | 12.515 | 5.365 | 400 |
| Preparation Example 21 (PCMAm5) | CMPC5 20 | 8.894 | 20.906 | 8.962 | 400 |

TABLE 6

| | Theoretical value(%) | | | | Experimental value (%) | | | |
|---|---|---|---|---|---|---|---|---|
| Category | C | H | N | O | C | H | N | O |
| Preparation Example 17 (PCMAm1) | 75.39 | 5.54 | 0.16 | 18.92 | 75.38 | 5.54 | 0.16 | 18.92 |
| Preparation Example 18 (PCMAm2) | 75.15 | 5.52 | 0.35 | 18.98 | 75.17 | 5.52 | 0.34 | 18.97 |
| Preparation Example 19 (PCMAm3) | 74.97 | 5.51 | 0.51 | 19.02 | 74.97 | 5.51 | 0.50 | 19.02 |
| Preparation Example 20 (PCMAm4) | 73.76 | 5.42 | 1.52 | 19.29 | 73.93 | 5.43 | 1.39 | 19.26 |
| Preparation Example 21 (PCMAm5) | 72.56 | 5.33 | 2.54 | 19.58 | 72.62 | 5.33 | 2.49 | 19.56 |

PREPARATION EXAMPLES 22-30

Reaction Between Polycarbonate (PCMAm 1-3) Containing Methylene Aminobenzylate Group and Dianhydride While charging 500 mL of a reactor equipped with a stirring plate and a nitrogen injection device with nitrogen, the polycarbonate containing methylene aminobenzylate prepared in Preparation Examples 12-14 and dianhydride were added with an appropriate amount calculated based on that of the polycarbonate containing methylene aminobenzylate and different substitution rate as shown in Table 7 to a reactor. The reaction mixture was reacted for 12 hrs while stirring to produce polycarbonate containing imide.

TABLE 7

| Category | Components | | | DMAc (mL) |
|---|---|---|---|---|
| | PC (g) | | dianhydride (g) | |
| Preparation Example 22 | PCMAm1 | 20 | BPDA 0.404 | 120 |
| Preparation Example 23 | PCMAm2 | 20 | 0.853 | 120 |
| Preparation Example 24 | PCMAm3 | 20 | 1.235 | 120 |
| Preparation Example 25 | PCMAm2 | 20 | BTDA 0.935 | 120 |
| Preparation Example 26 | PCMAm3 | 20 | 1.353 | 120 |
| Preparation Example 27 | PCMAm5 | 20 | 5.377 | 120 |
| Preparation Example 28 | PCMAm1 | 20 | DOCDA 0.363 | 120 |
| Preparation Example 29 | PCMAm3 | 20 | 1.109 | 120 |
| Preparation Example 30 | PCMAm5 | 20 | 4.409 | 120 |

TABLE 8

| Category | Polymer containing amic acid side chain | Film thickness((m) |
|---|---|---|
| Example 1 | Preparation Example 9 | 25 |
| Example 2 | Preparation Example 13 | 201 |
| Example 3 | Preparation Example 7 | 10 |
| Example 4 | Preparation Example 15 | 50 |
| Example 5 | Preparation Example 10 | 75 |
| Example 6 | Preparation Example 12 | 125 |
| Example 7 | Preparation Example 22 | 25 |
| Example 8 | Preparation Example 23 | 35 |
| Example 9 | Preparation Example 25 | 50 |
| Example 10 | Preparation Example 26 | 75 |
| Example 11 | Preparation Example 30 | 125 |
| Example 12 | Preparation Example 29 | 50 |

EXAMPLE 1

As shown in Table 8, a solution of the polysulfone containing amic acid prepared in Preparation Example 9 was coated onto a drum set at 80° C. by employing a comma coater, which is able to control a thickness with 75 μm and a width of 500 mm. The film was peeled off and then dried in a drying oven set at 120° C., a drying oven set at 180° C., and a drying oven set at 250° C. by holding at a tenter and wound around a roll to produce polysulfone film containing imide group.

EXAMPLE 2

As shown in Table 8, a solution of polysulfone containing amic acid prepared in Preparation Example 11 and a mixture of pyridine and acetic anhydride mixed in 1:1 were mixed and immediately coated on a 200 μm polysulfone film by a spray coating to be a thickness of 3 μm and a width of 500 mm. Then, it was then dried in a drying oven set at 80° C., a drying oven set at 120° C., and a drying oven set at 180° C. and wound around a roll to provide a polyfulfone film coated with the crosslinked polysulfone through imide groups

EXAMPLES 3-11

As shown in Table 8, a solution of polysulfone or polycarbonate containing amic acid prepared in Preparation Example 7, 8, 10, 12, 22, 23, 24, 26, and 30 was coated by employing a bar coater on a glass uniformly with a thickness of 30-200 μm and then dried in a convection oven set at 50° C. for 90 min. The film was peeled off from the glass, fixed into a supporting frame and then heat-cured at 120° C. for 1 hr, at 180° C. for 1 hr and 300° C. for 10 sec to produce the crosslinked polysulfone film through imide groups.

EXAMPLE 12

As shown in Table 8, a solution of polycarbonate containing amic acid prepared in Preparation Example 29 was coated onto a drum set at 80° C. by employing a comma coater, which is able to control a thickness, to be a width of 500 mm. The film was peeled off and then dried in a drying oven set at 120° C., a drying oven set at 180° C., and a drying oven set at 250° C. by holding at a tenter and wound around a roll to produce the crosslinked polycarbonate film through imide groups.

COMPARATIVE EXAMPLES 1-2

A solution was prepared by dissolving polysulfone (Comparative Example 1) and polycarbonate (Comparative Example 2) in DMAc to have 20 wt % of solid content and molded by a liquid molding process. The solution was coated by employing a bar coater on a glass uniformly with a thickness of 100 (m and then dried in a convection oven set at 50 (C for 90 min as described above-Examples. The film was peeled off from the glass, fixed into a supporting frame and then heat-cured at 100 (C for 1 hr and in a convection oven set at 160 (C for 1 hr to produce the desired film.

EXPERIMENTAL EXAMPLE 1

Comparison of Chemical Resistance

Chemical resistance was determined by dissolving each film prepared in Examples 1-12 and Comparative Examples 1 and 2 in each of dimethyl acetamide (DMAc), chloroform ($CHCl_3$), N-methylpyrrolidone (NMP), and dimethylformamide (DMF) and the result is summarized in Table 9.

TABLE 9

| Category | Solvent used for determining chemical resistance | | | |
|---|---|---|---|---|
| | DMAc | CHCl3 | NMP | DMF |
| Example 1 | X | X | X | X |
| Example 2 | X | X | X | X |
| Example 3 | Δ | X | Δ | X |
| Example 4 | X | X | X | X |
| Example 5 | Δ | X | Δ | X |
| Example 6 | X | X | X | X |
| Example 7 | Δ | X | Δ | X |
| Example 8 | X | X | Δ | X |
| Example 9 | X | X | Δ | X |
| Example 10 | X | X | X | X |
| Example 11 | X | X | X | X |
| Example 12 | X | X | X | X |
| Comparative Example 1 | ⊚ | ⊚ | ⊚ | ⊚ |
| Comparative Example 2 | ⊚ | ⊚ | ⊚ | ⊚ |

⊚: very well dissolved,
○: well dissolved
Δ: not well dissolved,
X: not dissolved As shown in Table 9, it is noted that the polysulfone films containing imide side chain prepared in Examples 1-12 exhibit much improved chemical resistance compared to PSF and PC films in Comparative Examples 1 and 2. It is also noted that chemical resistance of the films increased with increase of amount of imide or amic acid side chain.

EXPERIMENTAL EXAMPLE 2

Comparison of Thermal Properties

Figure 3:
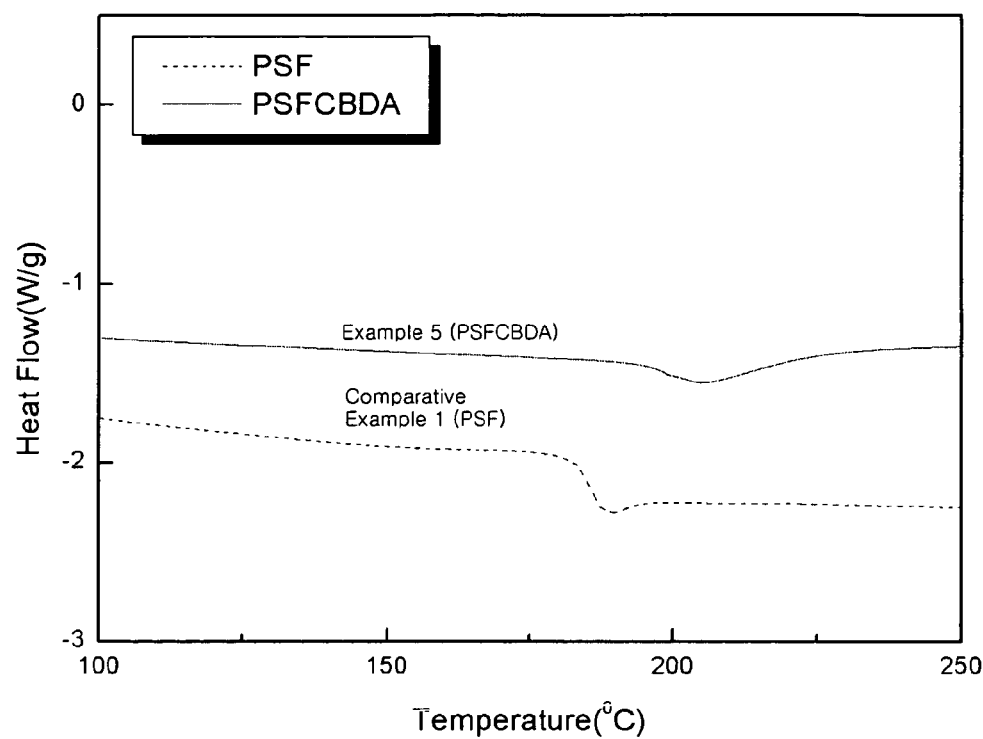
FIG. 3 is an analysis report by Differential Scanning Calorimetry of typical polysulfone (Comparative Example 1) and polysulfone (Example 5) crosslinked by imide side chain.

Thermal property of the films prepared in Example 5 and Comparative Example 1 was determined by employing a differential scanning calorimetry (DSC) and the result is illustrated in FIG. 3. As shown in FIG. 3, the polysulfone film containing imide side chain of Example 1 exhibits improved thermal property compared to the PSF film of Comparative Example 1 and coefficient of thermal expansion is significantly reduced by forming crosslikages with imide side chains (Table 10).

TABLE 10

| Category | Heat resistance(Tg, ° C.) | CTE(ppm/° C.) |
| --- | --- | --- |
| Example 1 | 207 | 47 |
| Example 2 | 206 | 51 |
| Example 3 | 203 | 50 |
| Example 4 | 211 | 40 |
| Example 5 | 204 | 69 |
| Example 6 | 270 | 45 |
| Example 7 | 168 | 55 |
| Example 8 | 171 | 50 |
| Example 9 | 172 | 52 |
| Example 10 | 174 | 49 |
| Example 11 | 210 | 46 |
| Example 12 | 174 | 67 |
| Comparative Example 1 | 190 | 80 |
| Comparative Example 2 | 155 | 100 |

CTE(Coefficient of Thermal Expansion) (ppm/° C.): 30~100° C.

EXPERIMENTAL EXAMPLE 3

Comparison of Flexibility

The films prepared in Examples 1 to 12 and Comparative Examples 1 and 2 were cut into a height of 0.5 cm and a length of 2 cm as sample and each sample was folded and unfolded 200 times to determine the formation of cracks for their flexibility test. The result is summarized in Table 11.

TABLE 11

| | No. of operation | | | |
| --- | --- | --- | --- | --- |
| | 10 | 20 | 30 | 50 |
| Example 1 | ⊚ | ⊚ | ⊚ | ⊚ |
| Example 2 | ⊚ | ⊚ | ⊚ | ⊚ |
| Example 3 | ⊚ | ⊚ | ⊚ | ⊚ |
| Example 4 | ⊚ | ⊚ | X | X |
| Example 5 | ⊚ | ⊚ | ⊚ | ⊚ |
| Example 6 | ⊚ | ⊚ | X | X |
| Example 7 | ⊚ | ⊚ | ⊚ | ⊚ |
| Example 8 | ⊚ | ⊚ | ⊚ | ⊚ |
| Example 9 | ⊚ | ⊚ | ⊚ | ⊚ |
| Example 10 | ⊚ | ⊚ | ⊚ | ⊚ |
| Example 11 | ⊚ | ⊚ | ⊚ | X |
| Example 12 | ⊚ | ⊚ | ⊚ | ⊚ |
| Comparative Example 1 | ⊚ | ⊚ | ⊚ | ⊚ |
| Comparative Example 2 | ⊚ | ⊚ | ⊚ | ⊚ |

X: formation cracks,
⊚: no changes

As shown in Table 11, it is noted that the polysulfone film containing imide side chain prepared in Examples 1 to 12 exhibit similar flexibility to those of the polysulfone and polycarbonate films prepared in Comparative Examples 1 and 2. Further, it is noted that the flexibility in the range of the present invention can be controlled by selecting an appropriate dianhydride.

INDUSTRIAL APPLICABILITY

Plastic substrates and optical films, particularly polysulfone, polycarbonate, polyethersulfone, generally used as a starting material for displays, are disadvantageous because they are easily soluble in organic solvents. However, the polysulfone and polycarbonate film containing imide side chain prepared by introducing amine side chain into the polysulfone and polycarbonate, reacting these amines with dianhydride to form amic acids, and imidization the result to imides provide thermal stability, chemical resistance without deteriorating transference and mechanical strength due to their structural and crosslinked characteristics. Thus, it facilitates the manufacturing process and provides uniform thickness when they are used for optical films, sheets, and display substrate due to their stablitities against chemicals.

Therefore, the films, sheets and coating solutions of the present invention can be widely used for electro-optic devices and display substrates on their own advantages, such as excellent thermal property, good mechanical property, and electrical property.

All documents mentioned herein are incorporated herein by reference in their entirety.

Even though the present invention is described in detail with reference to the foregoing embodiments, it is not intended to limit the scope of the present invention thereto. It is evident from the foregoing that many variations and modifications may be made by a person having an ordinary skill in the present field without departing from the essential concept of the present invention.

What is claimed is:

1. An aromatic polyether resin crosslinked by amic acid side chain expressed by formula 1a,

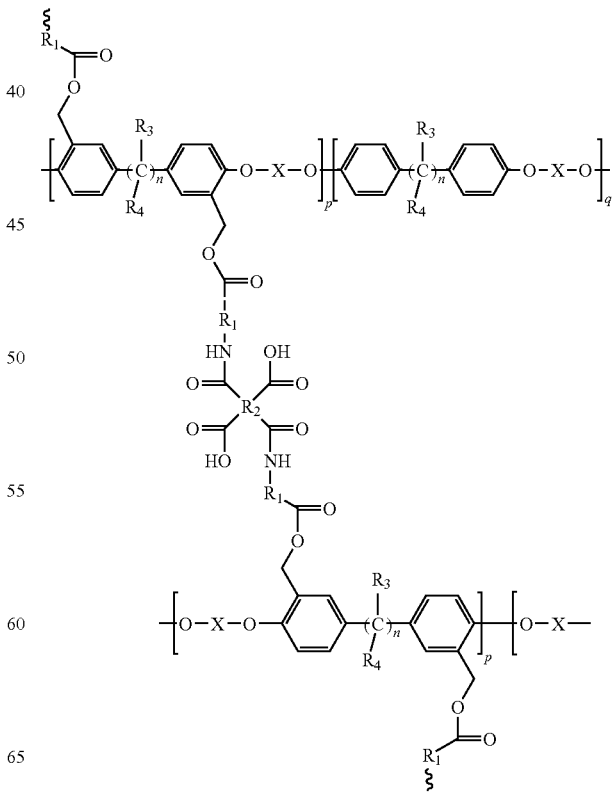

(Ia)

-continued

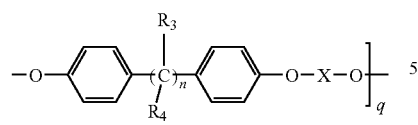

wherein X is

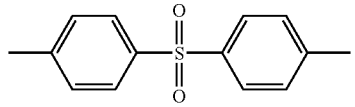

$R_1$ is an aliphatic, alicyclic, or aromatic group; $R_2$ is an aliphatic, alicyclic, or aromatic group; $R_3$ and $R_4$ are independently a hydrogen atom, a $C_1$-$C_6$ alkyl group, a phenyl group, or a benzyl group; n is an integer of 0 to 6; and p and q are independently an integer of 1 to 1000.

2. The aromatic polyether resin of claim 1, wherein p/p+q ratio is in the range of from 0.01 to 0.5.

3. The aromatic polyether resin of claim 1, wherein X is

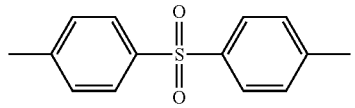

$R_1$ is an aliphatic, alicyclic, or aromatic group;

$R_2$ is an aliphatic, alicyclic, or aromatic group;

$R_3$ and $R_4$ are independently a hydrogen atom or a $C_1$-$C_6$ alkyl group;

n is 1; and p and q are independently an integer of 1 to 1000.

4. The aromatic polyether resin of claim 3, wherein $R_3$ and $R_4$ are methyl.

5. A method comprising:

i) preparing a chloromethylated polyether resin expressed by formula 2

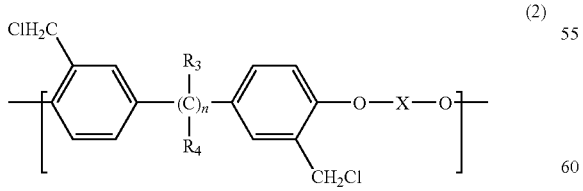

by introducing chloromethyl group (—$CH_2Cl$) to an aromatic moiety of an aromatic polyether resin;

ii) preparing a resin containing amine side chain (—$R_1$—$NH_2$) expressed by formula 3

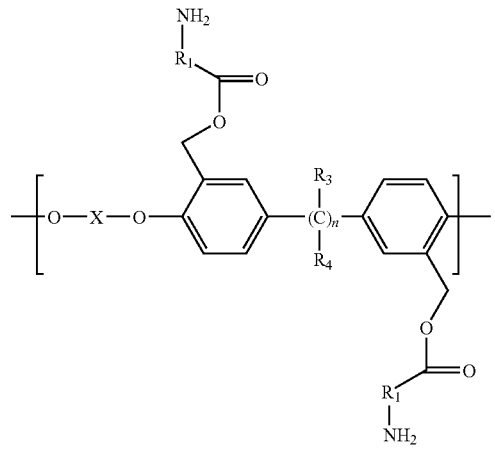

by introducing an amine compound expressed by [Y—$R_1$—$NH_2$ (Y=COOH)] to the chloromethyl group of the resin of formula 2;

iii) preparing a resin containing amic acid side chain which is crossliniked by the amic acid, expressed by formula 1a

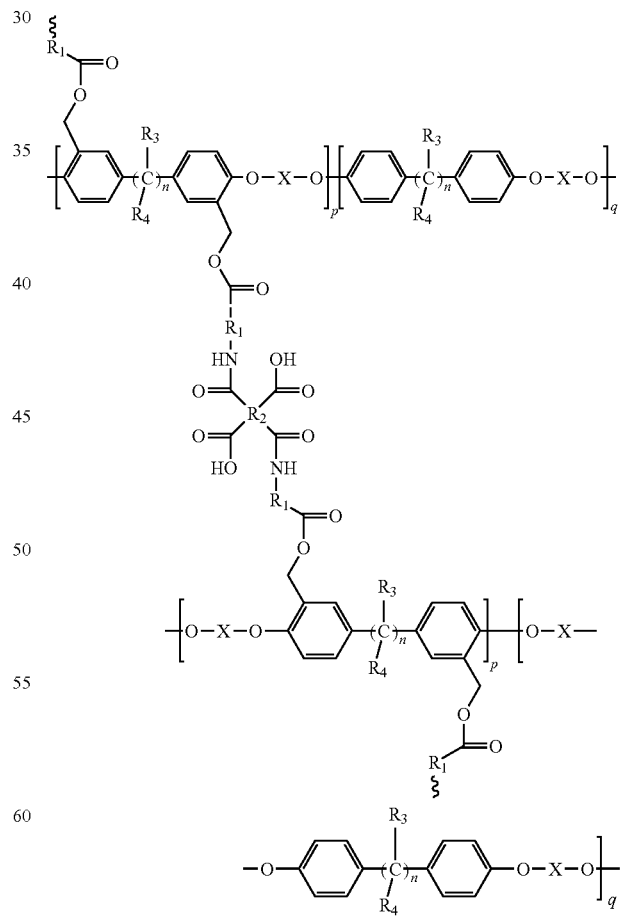

by reacting the aminated resin of formula 3 with dianhydride; and iv) preparing a resin containing imide side chain which is crossliniked by the imide, expressed by formula 1b

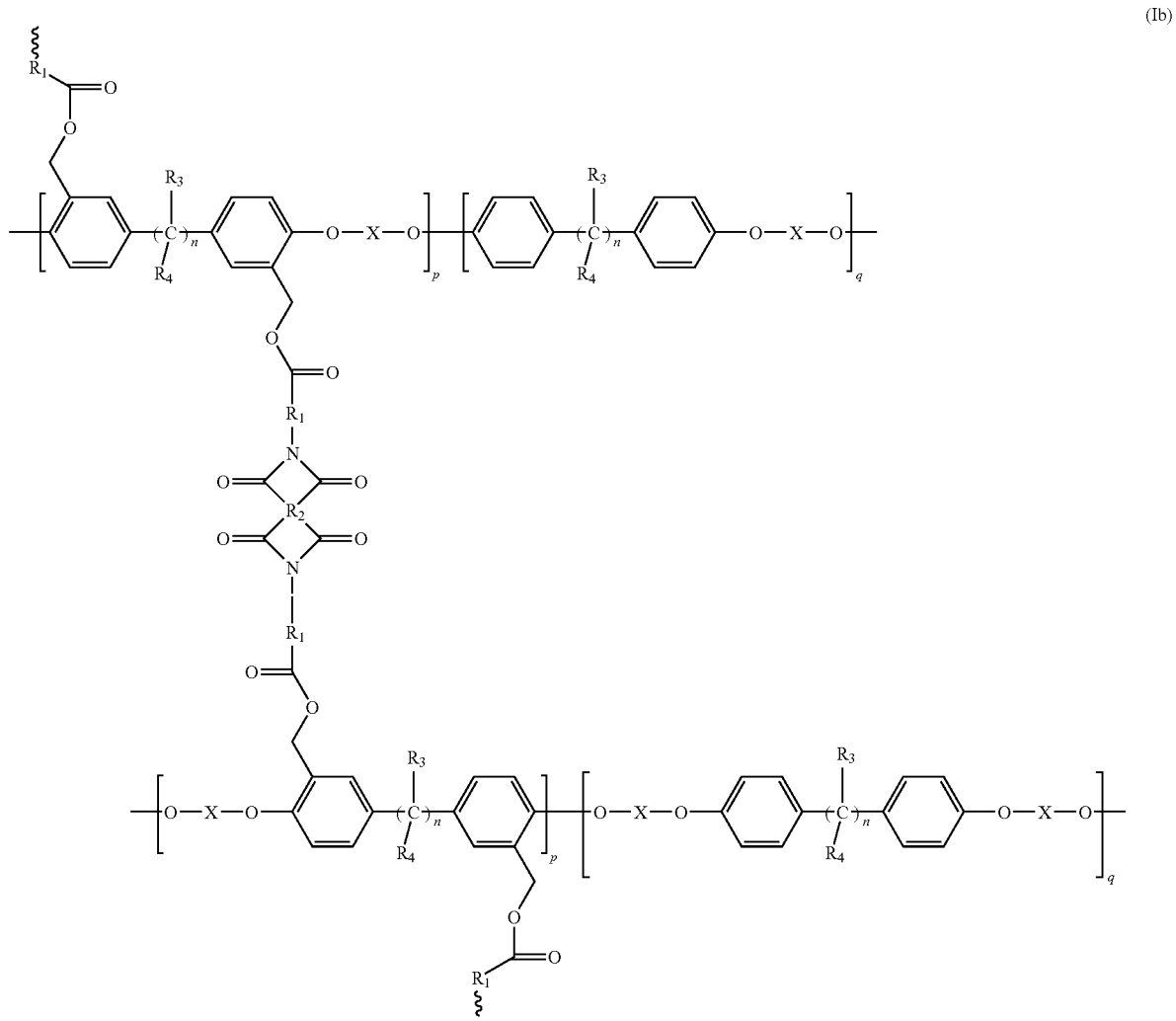

(Ib)

by heating the resin containing amic acid side chain of formula 1a, wherein X is

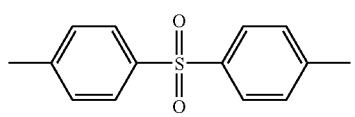

$R_1$ is an aliphatic, alicyclic, or aromatic group; $R_2$ is an aliphatic, alicyclic, or aromatic group; $R_3$ and $R_4$ are independently a hydrogen atom, a $C_1$-$C_6$ alkyl group, a phenyl group, or a benzyl group; n is an integer of 0 to 6; and p and q are independently an integer of 1 to 1000.

6. The method of claim 5, wherein said amine compound is: an aliphatic amine compound selected from the group consisting of 3-aminopropionic acid, 4-aminobutyric acid, 5-aminopentanoic acid, 6-aminohexanoic acid; an alicylic compound selected from the group consisting of 3-aminocyclobutane carboxylic acid, 3-aminocyclopentane carboxylic acid, 4-aminocyclohexane carboxylic acid, 4-aminocycloheptane carboxylic acid; an aromatic amine compound selected from the group consisting of 4-aminobenzoic acid, 4-amino-4-biphenyl carboxylic acid.

* * * * *

UNITED STATES PATENT AND TRADEMARK OFFICE
CERTIFICATE OF CORRECTION

| | |
|---|---|
| PATENT NO. | : 7,662,904 B2 |
| APPLICATION NO. | : 11/352885 |
| DATED | : February 16, 2010 |
| INVENTOR(S) | : Won et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 281 days.

Signed and Sealed this

Twenty-eighth Day of December, 2010

David J. Kappos
*Director of the United States Patent and Trademark Office*